United States Patent
May et al.

(10) Patent No.: US 7,385,875 B2
(45) Date of Patent: Jun. 10, 2008

(54) DISMISS ALL EVENT REMINDERS

(75) Inventors: Darrell May, Waterloo (CA); David P. Yach, Waterloo (CA); Andrew D. Bocking, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 83 days.

(21) Appl. No.: 11/278,496

(22) Filed: Apr. 3, 2006

(65) Prior Publication Data

US 2007/0230282 A1    Oct. 4, 2007

(51) Int. Cl.
*H04B 1/38* (2006.01)
(52) U.S. Cl. .......................... 368/10; 368/28; 368/29; 705/8; 705/9; 715/963; 455/556; 455/461; 455/566
(58) Field of Classification Search ................. 368/10, 368/28, 29; 705/8, 9; 715/963; 455/556, 455/461, 566
See application file for complete search history.

(56) References Cited

U.S. PATENT DOCUMENTS

| | | | |
|---|---|---|---|
| 6,763,226 B1* | 7/2004 | McZeal, Jr. ................. 455/90.2 |
| 2003/0032474 A1* | 2/2003 | Kaminkow .................... 463/25 |
| 2003/0087665 A1* | 5/2003 | Tokkonen ................... 455/556 |
| 2004/0057340 A1* | 3/2004 | Charles-Erickson et al. .. 368/10 |
| 2004/0177008 A1* | 9/2004 | Yang ........................... 705/26 |
| 2004/0216168 A1* | 10/2004 | Trovato et al. ............. 725/135 |
| 2006/0101116 A1* | 5/2006 | Rittman et al. ............. 709/204 |
| 2007/0038874 A1* | 2/2007 | Lin et al. .................... 713/300 |
| 2007/0060205 A1* | 3/2007 | Kim ........................... 455/566 |
| 2007/0072629 A1* | 3/2007 | Bae ............................ 455/461 |

OTHER PUBLICATIONS

Page 7 of "What's New For Outlook 2003", Mike Osborne, 2/25/2005/http://www.doa.state.wi.us/docs_view2.asp?docid=4545.

* cited by examiner

*Primary Examiner*—Gary F. Paumen
(74) *Attorney, Agent, or Firm*—Ridout & Maybee LLP

(57) ABSTRACT

A hand-held mobile electronic device that includes a controller, a display, a user input device, a storage, and a rigid case dimensioned to be held in a hand of a user, the case housing the controller, the display, the user input device and the storage. The controller is operative to: (i) maintain a list of pending event reminders that have been released for display; (ii) display on the display an event reminder window corresponding to one of the pending event reminders, the event reminder window including a first user selectable option to dismiss the event reminder corresponding thereto, and a second user selectable option to dismiss a plurality of the pending event reminders; (iii) if the first user selectable option is selected through the user input device, remove the displayed event reminder window from the display and display on the display a further event reminder window corresponding to a further one of the pending event reminders; and (iv) if the second user selectable option is selected through the user input device, remove the displayed event reminder window from the display and remove the plurality of pending event reminders from the list.

20 Claims, 5 Drawing Sheets

DISMISS ALL EVENT REMINDERS

FIELD

The present application relates to event reminders produced on a mobile device.

BACKGROUND

Communication devices, in particular handheld mobile communication devices, are becoming increasingly sophisticated. A common feature of such communication devices is a system or application for scheduling events and setting reminders such as, for example, a built-in calendar. Sometimes multiple event reminders will be generated over a period of time. If the user of the mobile device is not sure about what each of the pending event reminders is about, he may want to go through a screen/window for each event reminder, one at a time; however a device user that knows what the event reminders are about may find this to be unnecessary, and perhaps tedious.

Accordingly, it would be advantageous to improve mobile device implemented methods and systems for event reminding.

BRIEF DESCRIPTION OF THE DRAWINGS

Reference will now be made, by way of example, to the accompanying drawings which show example embodiments, and in which.

Similar or the same reference numerals may have been used in different figures to denote similar components.

DESCRIPTION OF EXAMPLE EMBODIMENTS

Figure 1:
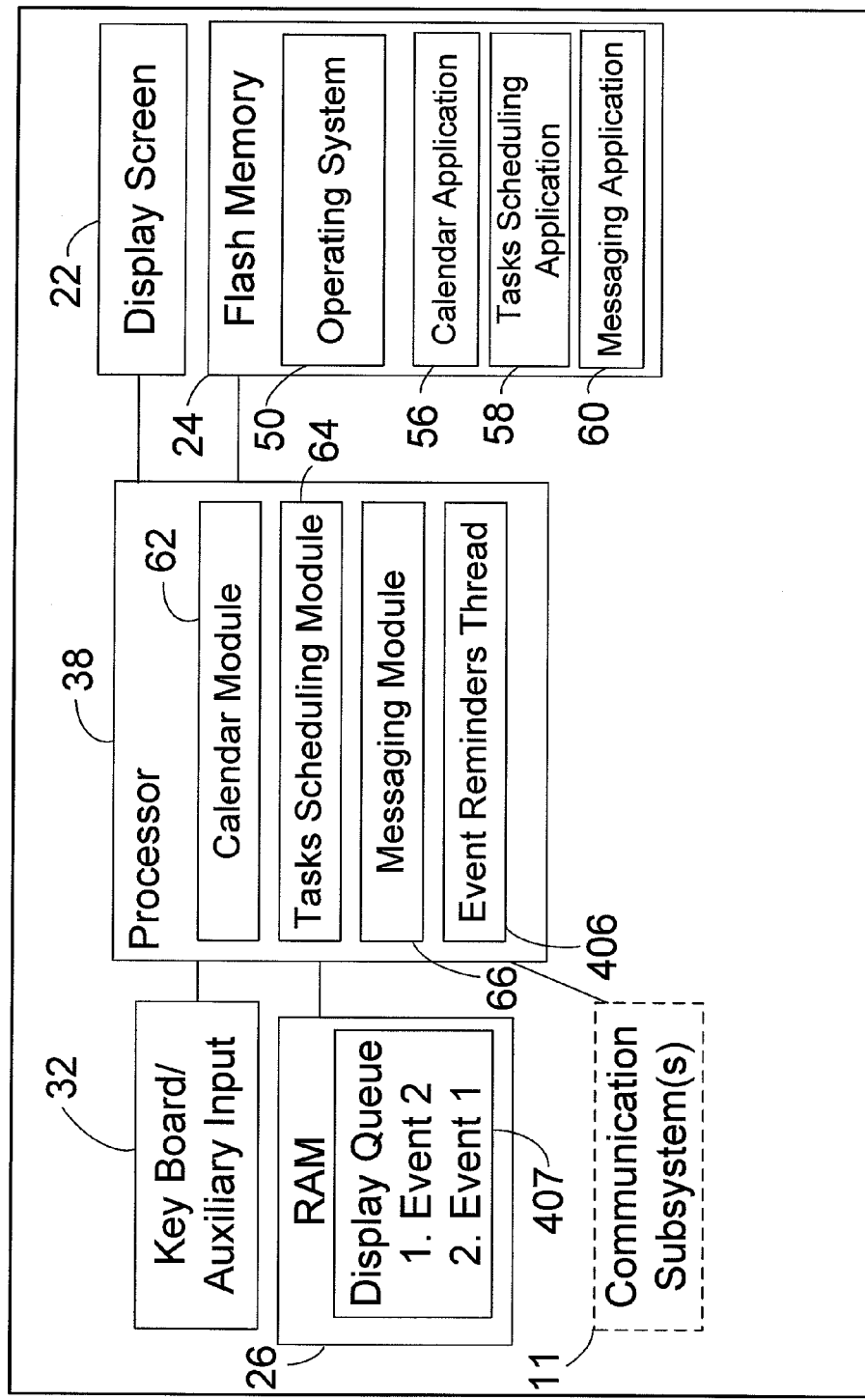
FIG. 1 shows a block diagram of an electronic mobile device to which example embodiments can be applied.

According to one example embodiment, there is provided a hand-held mobile electronic device that includes a controller including at least one processor, for controlling operation of the mobile device, a display coupled to the controller, a user input device coupled to the controller, a storage coupled to the controller, the storage storing event reminder information identifying a plurality of event reminders and times at which the event reminders are scheduled to be released for display on the display, and a rigid case dimensioned to be held in a hand of a user, the case housing the controller, the display, the user input device and the storage. The controller is operative to: (i) maintain a list of pending event reminders that have been released for display; (ii) display on the display an event reminder window corresponding to one of the pending event reminders, the event reminder window including a first user selectable option to dismiss the event reminder corresponding thereto, and a second user selectable option to dismiss a plurality of the pending event reminders; (iii) if the first user selectable option is selected through the user input device, remove the displayed event reminder window from the display and display on the display a further event reminder window corresponding to a further one of the pending event reminders; and (iv) if the second user selectable option is selected through the user input device, remove the displayed event reminder window from the display and remove the plurality of pending event reminders from the list.

According to another example embodiment is a hand-held mobile electronic device that includes processor means for controlling operation of the mobile device, display means responsive to the processor means for displaying information to a device user, user input interface means coupled to the processor means for receiving physical inputs from the device user, storage means coupled to the processor means for storing event reminder information identifying a plurality of event reminders and times at which the event reminders are scheduled to be released for display on the display, and a rigid case dimensioned to be held in a hand of the device user, the case housing the processor means, the display means, the user input interface means and the storage means. The processor means includes means for: (i) displaying a selection symbol on the display means and moving the selection symbol in response to inputs received through the user input interface means; (ii) releasing event reminders upon or after the times at which the event reminders are to be released; (iii) maintaining a queue of released event reminders; (iv) displaying on the display means a reminder event window corresponding to one of the reminder events, the reminder event window including a first visual indicator associated with a first user selectable option to dismiss the reminder event corresponding to the reminder event window, and a second visual indicator associated with a user selectable option to dismiss a plurality of the pending reminder events; (v) upon selection by the device user of the first user selectable option, removing the displayed reminder event window from the display and displaying on the display a further reminder event window corresponding to a further one of the pending reminder events; and (vi) upon selection by the device user of the second user selectable option, removing the displayed reminder event window from the display and removing the plurality of pending reminder events from the list.

According to another embodiments there is provided a method for managing event reminders. The method includes: providing a hand-held mobile electronic device that has: (a) a controller including at least one processor, for controlling operation of the mobile device; (b) a display coupled to the controller; (c) a user input device coupled to the controller; (d) a storage coupled to the controller, the storage storing event reminder information identifying a plurality of event reminders and times at which the event reminders are scheduled to be released for display on the display; and (e) a rigid case dimensioned to be held in a hand of a user, the case housing the controller, the display, the user input device and the storage; maintaining at the device a list of pending event reminders that have been released for display; displaying on the display an event reminder window corresponding to one of the pending event reminders, the event reminder window including a first user selectable option to dismiss the event reminder corresponding thereto, and a second user selectable option to dismiss a plurality of the pending event reminders; if the first user selectable option is selected through the user input device, removing the displayed event reminder window from the display and displaying on the display a further event reminder window corresponding to a further one of the pending event reminders; and if the second user selectable option is selected through the user input device, removing the displayed event reminder window from the display and removing the plurality of pending event reminders from the list.

The present description of example embodiments does not limit implementation to any particular computer programming language or system architecture. Embodiments described in the specification are not limited to any particular operating system (OS), mobile device architecture, server architecture, or computer programming language.

Any references herein to "messages" are not intended to be limited to e-mail, but should be understood to include other types of electronic messages that one skilled in the art would understand to be possible in the context in which the term is used. Other types of messages include text messages, audio messages, video messages, and other items. Likewise, the term "event" is used to designate any type of expected event, such as an appointment, a meeting, a conference call, a scheduled task, etc, for which a reminder can be generated for a user of the device.

Referring now to the drawings, FIG. 1 is a block diagram of an electronic mobile device 10 to which example embodiments can be applied. The mobile device 10 has a controller that includes at least one microprocessor 38 that controls the overall operation of the device. The microprocessor 38 interacts with device subsystems such as a display 22, persistent flash memory 24, volatile random access memory (RAM) 26, communication subsystem(s) 11 (the mobile device 10 may or may not include such a subsystem) and user input components 32 such as a keyboard or keypad and auxiliary on-screen navigation and selection input device(s) such as a touch screen, touch pad, directional button(s), joystick and/or scrollwheel.

Some examples of the mobile device 10 include the wireless communications subsystem(s) 11 for exchanging communications with one or more communications networks including, for example, cellular type wide area wireless networks and/or wireless local area networks. In some examples, the mobile device 10 is a two-way, electronic communications device having data and possibly also voice communication capabilities. In some examples, the mobile device 10 has the capability to exchange messages with other devices and computer systems on the Internet. Depending on the functionality provided by the mobile device 10, in various examples the mobile device may be a multiple-mode communication device configured for both data and voice communications, a smartphone, a Personal Digital Assistant (PDA), or a mobile computer system among other things. In some examples, the mobile device 10 is not a wireless communications device. For example, there exist PDAs that are not capable of sending and receiving wireless communications.

Operating system software 50 and various software applications (for example, calendar application 56, tasks scheduling application 58 and messaging application 60) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the calendar application 56, the tasks scheduling application 58 and the messaging application 60) on the mobile device 10. A predetermined set of software applications which control basic device operations, including data and voice communication applications for example, will normally be installed on the mobile device 10. In some embodiments, the processor 38 is configured to implement a number of modules for interacting with the various device subsystems described above (or other device subsystems). In some embodiments, some or part of the functionality of a number of these modules can be implemented through firmware or hardware components instead of, or in combination with, computer software instructions executed by the microprocessor 38 (or other processors).

As a first module example, under instructions from the calendar application 56 resident on the mobile device 10, the processor 38 could be configured to implement calendar module 62. The calendar module 62 facilitates device user scheduling and reminding in relation to appointments, meetings and the like. In some examples, the calendar module 62 handles meeting invitations sent and received over a communication network, through the communication subsystem 11.

As a second module example, under instruction from the tasks scheduling application 58 resident on the mobile device 10, the processor 38 could be configured to implement tasks scheduling module 64. The tasks scheduling module 64 facilitates device user scheduling and reminding in relation to tasks. Tasks that the device user schedules will normally be something other than an appointment or a meeting. For instance, examples of task events include scheduled moments in a day when medication needs to be taken, or scheduled moments in a day when household chores such as watering plants need to be done. Of course other tasks are also contemplated. In some examples, the tasks scheduling module 64 permits scheduling of recurrent tasks.

As a third module example, under instruction from the messaging application 60 resident on the mobile device 10, the processor 38 could be configured to implement messaging module 66. The messaging module 66 enables composition of data items, such as e-mail messages for example. Such composed items may then be transmitted over a communication network through the communication subsystem 11. Conversely, messages can be received through the communication subsystem 11 for processing by the messaging module 66. The calendar application, tasks scheduling application and/or messaging application and their associated modules can, in example embodiments, be implemented as components of a personal information manager (PIM) application.

Figure 2:
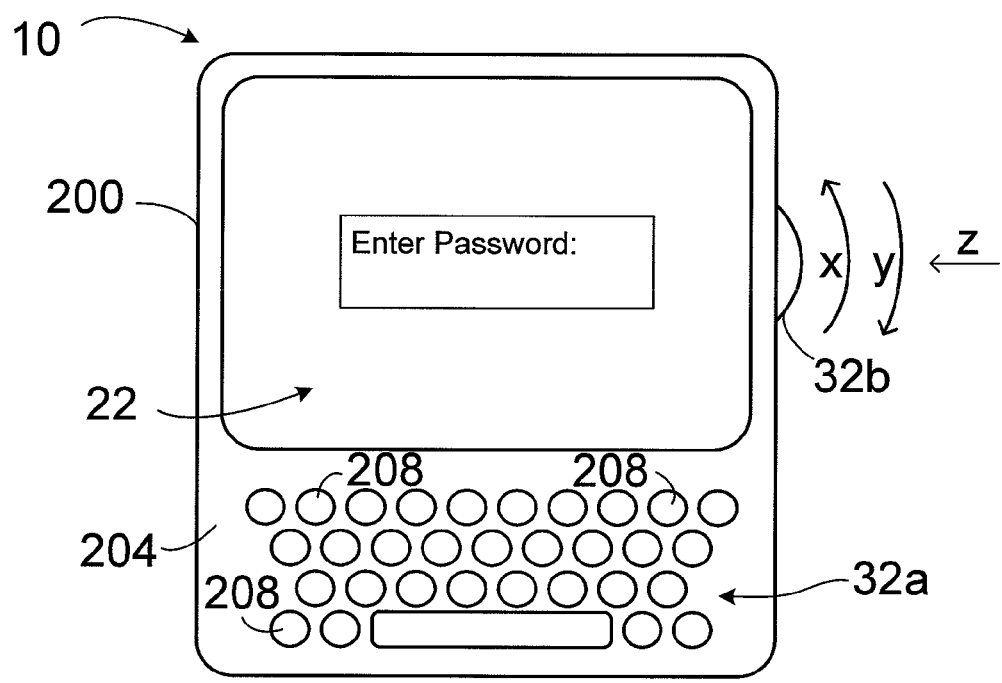
FIG. 2 is a front or plan view, in diagrammatic form, of an example of the device of FIG. 1.

With reference now to FIG. 2, in some examples, the components and subsystems of mobile device 10 are housed within a rigid case 200 that is configured to be held with one or two hands while the mobile device 10 is in use. The case 200 may include two or more parts that are pivotally or slidably connected together. The mobile device 10 is, in some examples, small enough to fit inside a standard purse or coat pocket. In the illustrated embodiment, alphanumeric keyboard or keypad 32a is horizontally positioned symmetrically between a left edge and a right edge of a face 204 of the mobile device 10. The keyboard 32a includes several keys 208 for user input of displayable numbers, letters or other characters.

In some examples, the keys 208 of the keyboard 32a consist of number, pound and asterisk keys typically found on any telephone, plus a few additional keys associated with miscellaneous inputs (for example, a hang up or answer call key); however in examples such as the illustrated example, the keyboard 32a has a larger number of keys. In the illustrated example, the keyboard 32a mimics standard full-sized keyboards normally associated with personal computers (e.g. a number of the keys 208 could each permit input of a particular letter of the alphabet). The illustrated keyboard 32a also includes one or more special keys that can be held down to give an alternate meaning to other keys/components when depressed. In at least one example, these one or more special keys include an Alt key. As will be appreciated by those skilled in the art, keys that give alternate meaning to other input components enable expanded input capability such as, for example, the ability to provide for so-called "shortcut keys".

The illustrated mobile device 10 also includes a scrollwheel 32b that can be rotated upwards towards an upper end of the device or downwards towards a bottom end of the device, as indicated by the arrows x and y respectively. Rotation is about an axis perpendicular to the face 204 of the mobile device 10. In the illustrated example, the scrollwheel 32b protrudes through an opening that is provided through a side of the housing case 200 so as to be adapted for manipulation by a thumb (or other hand digit) of a user of the mobile device 10. In addition to being rotatable, the illustrated scrollwheel 32b can also be depressed inwardly as indicated by arrow z.

Figure 3:
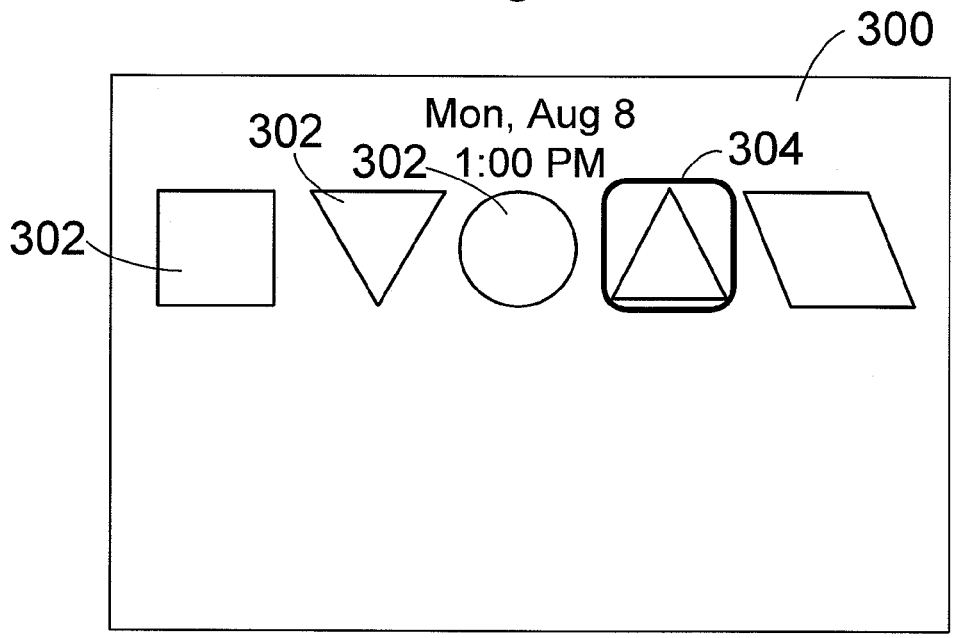
FIG. 3 shows, in diagrammatic form, a user interface screen of an operating system within which a user of the device shown in FIG. 1 can request that an application be run.

Having discussed examples of physical input components of the mobile device 10, a number of example user interface screens of the mobile device 10 are now described in order that details of example embodiments may be expounded upon. Beginning with reference to FIG. 3, user interface screen 300 is generated by the operating system 50 to provide the device user with choices of applications that can be run. In the illustrated example, various applications each have an associated selectable icon 302. For instance, one of the icons 302 might be associated with the calendar application 56, another of the icons 302 might be associated with the tasks scheduling application 58, and yet another of the icons 302 might be associated with the messaging application 60. In at least one example, the device user can rotate the scrollwheel 32b in either direction x or y, causing selection symbol 304 to move through the icons 302 until it is positioned on the icon 302 associated with the application that the device user wants to launch. The device user can then depress the scrollwheel 32b in direction z. This input action is translated by the operating system 50 into a request for the application associated with the selected icon to be launched. In at least one example, one or more alternative input components can be operated to carry out the same application launch request, for instance, pressing of a combination of arrow keys and an Enter key or pressing one or more shortcut keys.

Once the operating system 50 launches the appropriate application, the user interface screen 300 may be replaced by whatever startup interface screen is generated by the launched application. The device user would then typically proceed through further user interface screens of the application that was launched. For example, if the device user launches the calendar application 56, the device user may need to navigate through a number of user interface screens in order to enter the details of (and set) various calendar event reminders. As another example, if the device user launches the tasks scheduling application 58, the device user may need to navigate through a number of user interface screens in order to enter the details of (and set) various task event reminders.

Event reminder details can be stored on the mobile device 10 and will vary depending upon the type of event reminder that is being set. Possible details for a calendar event reminder may include, for example, a short meeting/appointment subject description, meeting/appointment location, event start time, event end time, number of minutes prior to the start time that the reminder is to be generated, meeting/appointment description, etc. Possible details for a task event reminder include, for example, a short subject description of the task, the due date for the task, the start date of the task, status of the task, priority of the task, percentage of the task that has been completed, date and time the task reminder is to be initiated, the description of the task, etc. Thus event reminder details may vary significantly depending upon the type of event reminder that the device user creates; however in at least one example embodiment any event reminder that is set by an application running on the device 10 is registered with an event reminders thread 406 (FIG. 1) that maintains in storage (for example flash memory 24 and or RAM 26) a list or queue of event reminders that are scheduled for future release at designated times.

In some example embodiments, after each event reminder is released by the event reminders thread 406, a corresponding GUI event reminder window is generated in response to the release of that event reminder from the event reminders queue. The typical purpose of the reminder window is of course to remind the device user, by way of a visual alert, that there is an upcoming event. In some embodiments, release of an event reminder may be complimented by an audible and/or vibrational alert.

In accordance with at least some examples, the generated reminder window presents the device user with the option of dismissing the reminder. It will be understood that by dismissing the reminder the device user is acknowledging the reminder and instructing the mobile device 10 that he does not need to be reminded about the reminder again.

In at least some example embodiments, once a reminder window is displayed on display 22 it remains there until a further action occurs, such as the user taking some action to remove the event reminder, and due to restrictions in screen size and/or other device resources, only a single event reminder window is displayed to a user of the device at any given moment in time. In some circumstances, a plurality of event reminders may be queued for display. For example, while an event reminder window is being displayed, one or more additional event reminders may be released by the event reminders thread 406. A similar situation may occur in situations where the mobile device 10 is turned off for a period of time, and then turned back on after the scheduled reminder release times have passed. Similarly, if a device is locked for a period of time, a plurality of event reminders may be released while the device is locked—although the device may be configured to issue a physical or audible alert when a reminder is released and the device is in a locked state, the device in an example embodiment will not display the event reminder details until the device is unlocked by an authorized user (through entry of a shared secret or some other user verification method), resulting in a backlog of event reminders to display. Embodiments will now be described for user interface methods for assisting a device user when multiple pending event reminders exist at a given time.

In an example embodiment, the event reminders thread 406 maintains a display list or queue 407 identifying all pending event reminders that have been released for display, but which have not yet been dismissed or snoozed or otherwise acted on by the user. The queue may be implemented in a number if ways, for example as a dedicated queue, or through attributes assigned to individual event reminders in the comprehensive list of scheduled event reminders that is maintained by the event reminders thread 406. FIG. 1 shows a notional representation of display queue 407 residing in RAM 26—the queue 407 could also be partly or wholly stored in a persistent storage such as flash memory 24.

In an example embodiment, when the device 10 is on and the scheduled time for an event reminder occurs, information about the event reminder is added to the display queue 407 whether the device 10 is locked or not. In some embodiments, if the device 10 is turned off when a scheduled event reminder time passes, information about the event reminder is added to the display queue 407 when the device 10 is next powered up. As shown in FIG. 1, information for two event reminders, Event 1 and Event 2, are present in the display queue 407. When there are pending event reminders in the display queue 407 and the device is in an unlocked state, then a event reminder dialog window providing the details of the top entry in display queue will be shown on the display 22. When there is more than one event reminder pending in the event reminder display queue 407, the event reminder window currently displayed on display 22 will present the device user with a number of selectable options, at least two of which are the following: "Dismiss" and "Dismiss All". In accordance with at least one example embodiment, choosing the "Dismiss" option will only cause the currently displayed event reminder window to be removed from display (and display queue 407) and the next event reminder window will simply replace it on display screen 22, whereas selecting the "Dismiss All" option will set the status attributes of at least all pending event reminders of the same type to dismissed and therefore the device user will be able to clear the display of event reminder windows (and clear the display queue 407) without the need to look at the remaining event reminders (or at least the remaining event reminders that are of the type with respect to which the user chose to "Dismiss All").

Figure 4:
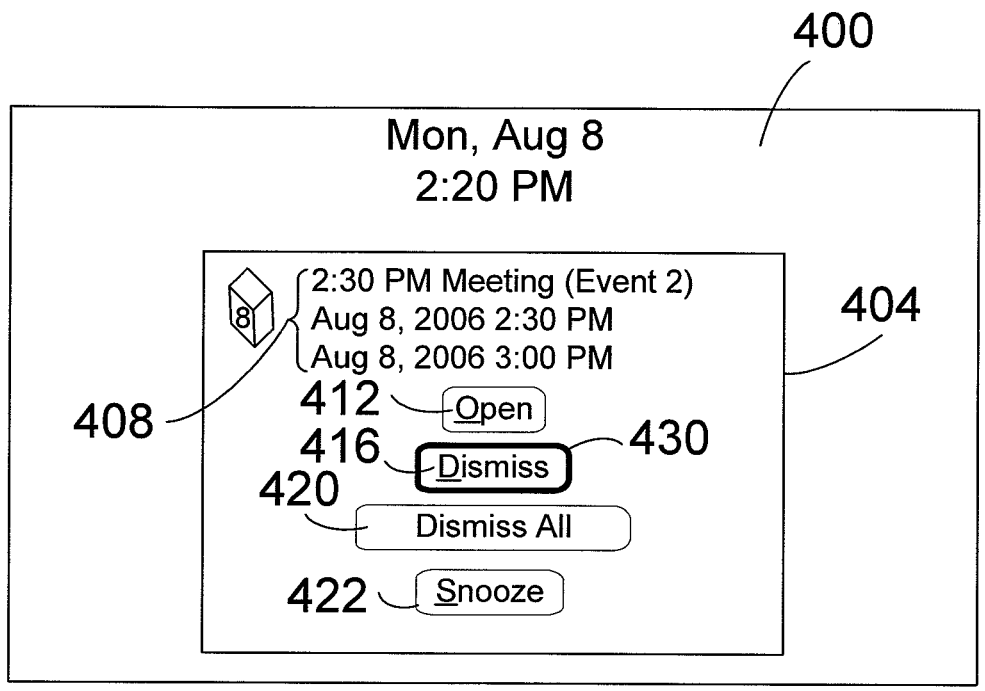
FIG. 4 shows, in diagrammatic form, a calendar event reminder window in the foreground of a user interface screen.
Figure 5:
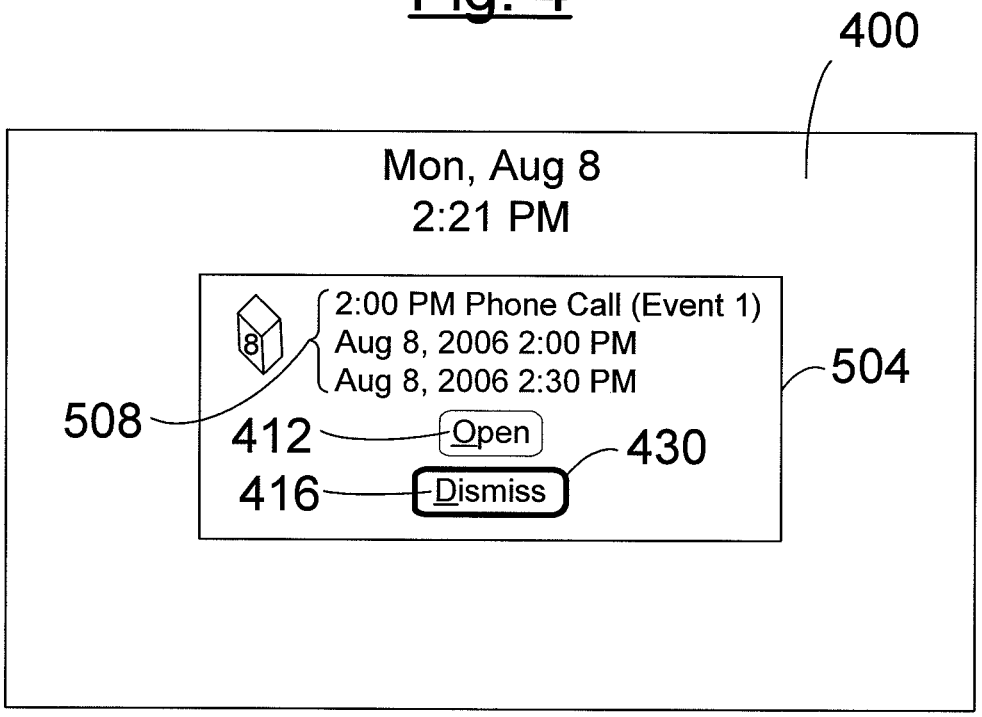
FIG. 5 shows, in diagrammatic form, a reminder window similar to the reminder window shown in FIG. 4, but displayed after the first calendar event reminder has been dismissed.

To facilitate an understanding of the selectable "Dismiss All" option in accordance with example embodiments, example event reminder windows shown in FIGS. 4-7 will presently be described. Turning now to FIGS. 4 and 5, these figures show a user interface screen 400 on which event reminder dialog windows 404, 504 have been generated as foreground windows. Event reminder windows 404 and 504 pertain to scheduled calendar events, and in the present example, event reminder window 404 corresponds to "Event 2" of display queue 407, and event reminder window 504 corresponds to "Event 1" of display queue 407. In the example, the scheduled reminder time for Event 1 was 1:45 PM, and the scheduled reminder time for Event 2 was 2:15 PM.

The situation where the device 10 was in a locked state at the occurrence of the reminder times, and then subsequently unlocked will now be discussed. At the scheduled reminder time of 1:45 PM for Event 1, the event reminders thread 406 "fires" or releases the event reminder for Event 1, causing Event 1 to be added to the pending display queue 407; at the scheduled reminder time of 2:15 for Event 2, the event reminders thread 406 "fires" or releases the event reminder for Event 2, causing Event 2 to be added to the pending display queue 407. The release of the event reminders to the display queue 407 may be accompanied by an audible and/or vibrational alert depending on the user selected preferences, however, as the device is locked, event reminder windows are not displayed to the user. When the device is next unlocked, the processor 38 causes the event reminder window 404 for Event 2 to be displayed on the foreground of the interface screen 400. In the present example, the display queue 407 is processed in reverse chronological order (last in first out) in that the event reminder most recently added to the queue is the event reminder that gets currently displayed on the device display screen 22. In other embodiments, the display order can be reversed and/or may be a user configurable option.

The event reminder dialog window 404 shows particulars 408 of the calendar event reminder, which includes some of the possible details for calendar event reminders that were described previously in this disclosure. It is contemplated that the displayed particulars could include more or fewer details than those of the illustrated particulars 408. The dialog window 404 also presents the device user with four selectable options 412, 416, 420, and 422 which are "Open", "Dismiss", "Dismiss All" and "Snooze". In at least one example, the device user can, in response to being prompted to take action, rotate the scrollwheel 32b in either direction x or y causing selection symbol 430 to move through the options 412, 416 and 420 until the position marker or selection symbol 430 is positioned on the option intended to be selected. (Navigation through the options by means of some other input component(s) such as, for example, arrow keys or a Tab key is also contemplated.)

In the illustrated example, the device user has navigated the selection symbol 430 onto the "Dismiss" option 416, and by doing so the device user can dismiss the currently displayed calendar event reminder simply by, for example, depressing the scrollwheel 32b or depressing the Enter key on the keyboard 32a. Once this is done, the dialog window 404 will be cleared from the screen 400 and the display queue 407; however dialog window 504 (FIG. 5) corresponding to the event reminder for event 1 will quite quickly appear in its place. Again the dialog window 504 is in the foreground of user interface screen 500. Also, dialog window 504 shows particulars 508 of the calendar event reminder with respect to which it corresponds, and the device user is presented with at least two of the three previously mentioned options, namely the "Open" and "Dismiss" options 412 and 416 (the "Snooze" option could also be presented). Here again the device user could, in response to being prompted to take action, navigate the selection symbol 430 over the selectable option 416 to dismiss the currently displayed event reminder from the display and from the display queue 407.

Referring again to FIG. 4, had the device user chosen the "Dismiss All" option 420 instead of the "Dismiss" option 416, a different sequence of events would have occurred. In particular, if the device user had chosen the "Dismiss All" option 420, this would have not only have caused the 2:30 PM Meeting (Event 2) reminder to be cleared from the display screen 22 and the display queue 407, but would have also have cleared all pending event reminders out of the display queue 407, including the 2:00 PM Phone Call (Event 1) reminder. Consequently, the event reminders thread 406 causes removal of the dialog window 404 from the display screen, and the dialog window 504 is never generated to replace the dialog window 404 because the display queue 407 is empty. Thus in the present example, the user can through moving the selection symbol 430 to the "Dismiss All" option and depressing the scrollwheel clear out all pending event reminders without having to view each event reminder individually.

In the event that the user selects the "Snooze" option in FIG. 4, the corresponding event reminder is erased from the display and the display queue 407 and scheduled by the event reminders thread for future release, and the next pending event reminder in the queue 407 is displayed.

Although the "Dismiss All" option example described above concerned two pending calendar event reminders, the "Dismiss All" option will serve the same purpose in instances where there are three, four or any plurality of pending calendar event reminders. In at least some examples, the initial calendar event reminder window will present the device user with both the "Dismiss" and "Dismiss All" options, and in some implementations choosing "Dismiss All" will set the status attribute of only all calendar event reminders to dismissed (i.e. only all of those of the same type, for example, only calendar reminder entries but not task reminders) but in other implementations choosing "Dismiss All" will set the status attribute of all event reminders to dismissed (regardless of type—for example, all calendar reminder entries, and task reminders). If the device user instead chooses to go through the calendar reminders one at a time, the "Dismiss All" option will continue to be presented in subsequent replacement windows until there is only one pending calendar event reminder (for those implementations where choosing "Dismiss All" only dismisses all pending calendar event reminders) or until there is only one pending event reminder of any type (for those implementations where choosing "Dismiss All" dismisses all pending event reminders regardless of type).

In one example embodiment, where the device 10 is turned off when the scheduled reminder time occurs, the event reminders are released to the display queue 407 when the device is next turned on, for processing when the device is subsequently unlocked. In an example embodiment, in a situation where the device is not locked when an event reminder is released to the display queue, the event reminder window corresponding to the most recently released event reminder is immediately displayed on the device display in place of any event reminder widow that may be currently displayed, and pushes the older event reminder down into the display queue 407.

In some examples, the user interface of device 10 is configured such that a device user can toggle through the event reminder dialog windows 404, 504 without choosing any of the selectable options 412, 416, 420 or 422. The device user could do this by pressing special meaning key(s) or a special meaning key and scroll combination. For instance, the device user could hold down the Alt key on the keyboard 32*a* while rotating the scrollwheel 32*b* to go from one event reminder dialog window to the next event reminder dialog window. Thus, on one embodiment, the processor 38 is configured to proceed sequentially through the pending display queue 26 and display corresponding event reminder windows as the user presses the designated key while rotating the scroll key. Such a configuration allows the user to quickly flip through the pending event reminders.

Figure 6:
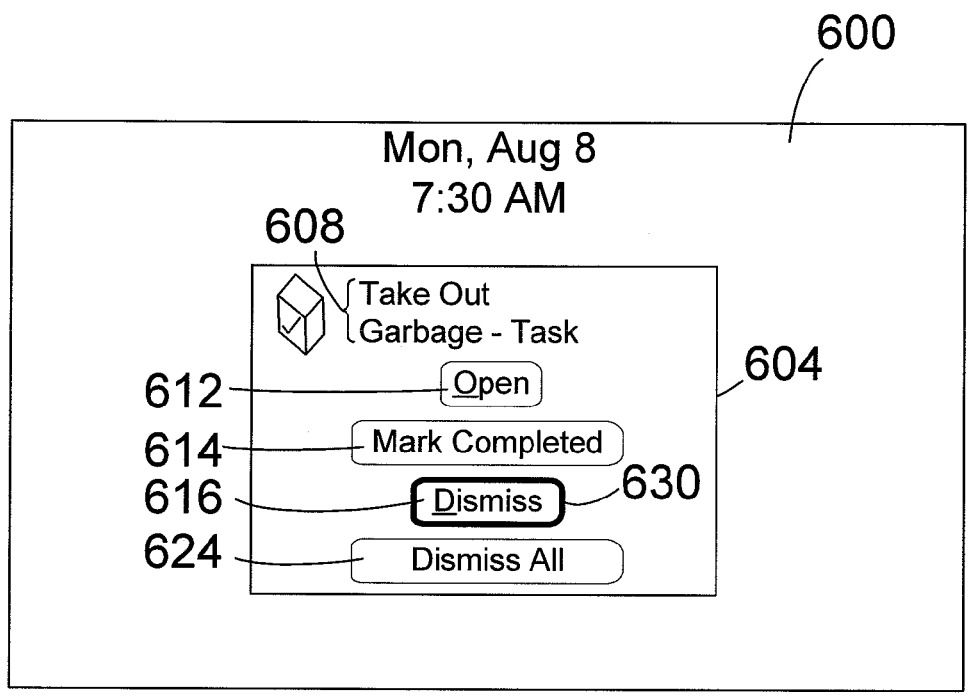
FIG. 6 shows, in diagrammatic form, a task event reminder window in the foreground of a user interface screen.
Figure 7:
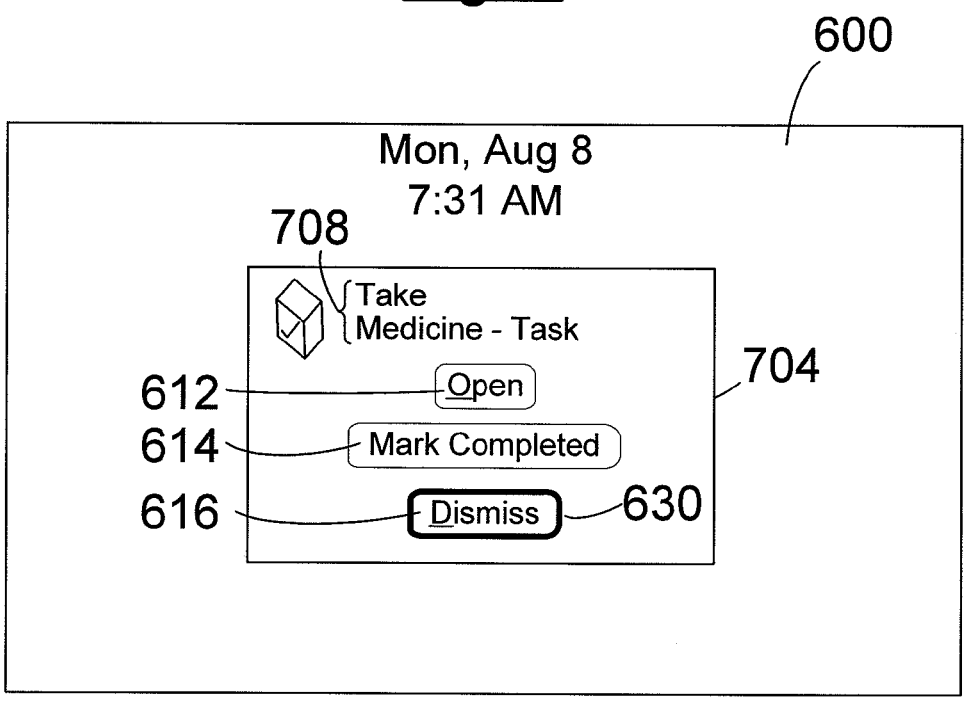
FIG. 7 shows, in diagrammatic form, a reminder window similar to the one shown in FIG. 6, but displayed after the first task event reminder has been dismissed.

Turning now to FIGS. 6 and 7, these figures shows another user interface screen 600 that includes sequentially displayed task event dialog windows 604 and 704 on the foreground of the screen 600. Event reminder dialog window 704 corresponds to a task having an event reminder scheduled earlier than the task corresponding to event reminder dialog window 604. Task reminders in an example embodiment are processed in a similar manner to calendar reminders as described above. In the illustrated example, the dialog window 604 was generated in response to the release of a task event reminder to an event reminder display queue maintained by the event reminders thread 406 (which may be the same display queue 407 as used for calendar event reminders, or may in some embodiments be a different queue that is processed either before or after the calender event reminders display queue) In the example, at least one other pending event reminder (namely the event reminder associated with window 704) has previously been released by the event reminder thread to the display queue 407, and not yet acted on by the device user.

The dialog window 604 shows particulars 608 of a task event reminder, which includes a number of the possible details for task event reminders that were described previously in this disclosure. It is contemplated that the displayed particulars could include more or fewer details than those of the illustrated particulars 608. One skilled in the art will appreciate that while the event reminders thread 406 can initiate generation of the dialog window 604, in some implementations, the event reminders thread 406 may not be able to obtain the particulars 608 independently, but instead obtains them through interaction with the tasks scheduling application 58.

The dialog window 604 also presents the device user with four selectable options 612, 614, 616 and 624, which are "Open", "Mark Completed", "Dismiss" and "Dismiss All". In at least one example, the device user can, in response to being prompted to take action, rotate the scrollwheel 32*b* in either direction x or y causing selection symbol 630 to move through the options 612, 614, 616 and 624 until it is positioned on the option intended to be selected. (Navigation through the selectable options by means of some other input component(s) such as, for example, arrow keys or a Tab key is also contemplated.)

In the illustrated example, the device user has navigated the selection symbol 630 onto the option 616 (the "Dismiss" option rather than the "Mark Completed" option is described below; however the "Mark Completed" option has a similar effect when selected but additionally has the effect of recording in the data store of the mobile device 10 that the taking out the garbage task has been completed). At the illustrated stage, the device user can dismiss the currently displayed task event reminder simply by, for example, depressing the scrollwheel 32*b* or depressing the Enter key on the keyboard 32*a*. Once this is done, the dialog window 604 will be cleared from the screen 600 and the corresponding event reminder cleared from display queue 407; however dialog window 704 (FIG. 7) corresponding to the next task event reminder in display queue 407 will quite quickly appear in its place. Again the dialog window 704 is in the foreground of user interface screen 700. Also, dialog window 704 shows particulars 708 of the task event reminder with respect to which it corresponds, and the device user is presented with three of the four previously mentioned options, namely the options 612, 614 and 616. Here again the device user could, in response to being prompted to take action, navigate the selection symbol 630 over the selectable option 616 to dismiss the currently displayed event reminder.

Referring again to FIG. 6, had the device user chosen the "Dismiss All" option 624 instead of the "Dismiss" option 616, a different sequence of events would have occurred. In particular, if the device user had chosen the "Dismiss All" option 624, this would have not only have caused the "take out garbage" reminder to dismissed, but would have also caused the "take Medicine" reminder to dismissed as well from the display queue 407. Consequently, the event reminders thread 406 would have again initiated removal of the dialog window 604 from the screen, but the dialog window 704 would never have been generated to replace the dialog window 604. Thus in the present example the two user actions of operating at least one input component to dismiss the "take out garbage" reminder and again operating at least one input component to dismiss the "take Medicine" reminder can effectively be carried out in one user action by operating at least one user input component to choose the "Dismiss All" option 624.

Figure 8:
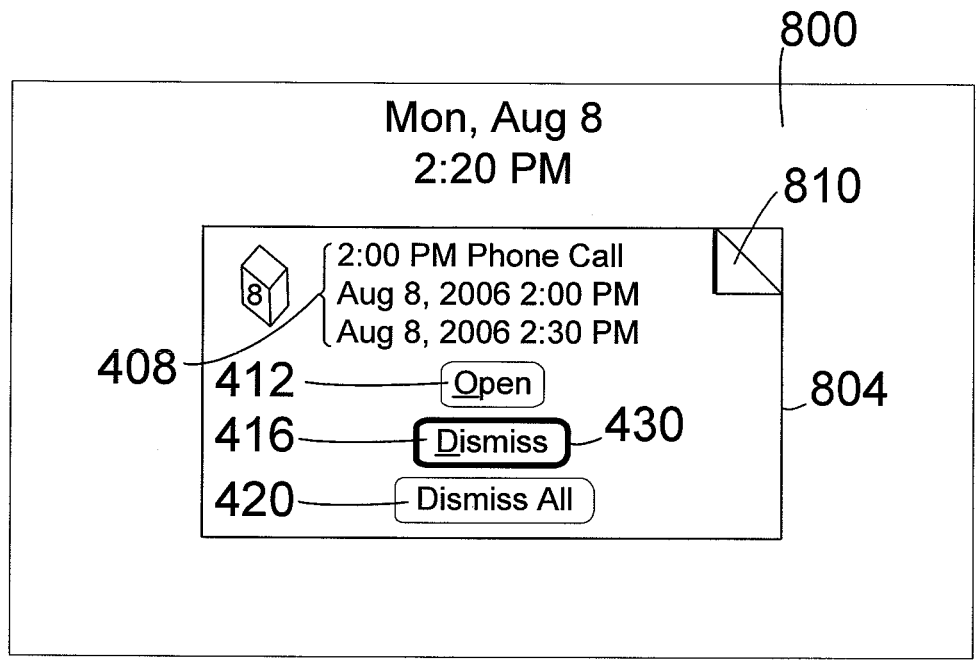
FIG. 8 shows, in diagrammatic form, an alternative reminder window similar to the one shown in FIG. 4.

FIG. 8 shows an alternative reminder window 804 similar to the one shown in FIG. 4. The reminder window 804 is in the foreground of user interface screen 800 and includes graphical indication 810 for indicating that there are multiple pending event reminders rather than a single pending event reminder. Although the illustrated graphical indication is a bent paper corner, any suitable visual indication is contemplated. For instance, dialog window 908 in FIG. 9 includes indication 930 in the form of an expression x/y, where in one example y is the number of pending calendar event reminders (in one alternative example y is the number of pending event reminders of any type, and in yet another example y is the number of pending task event reminders). X in the expression x/y is a whole number between 1 and y.

Figure 9:
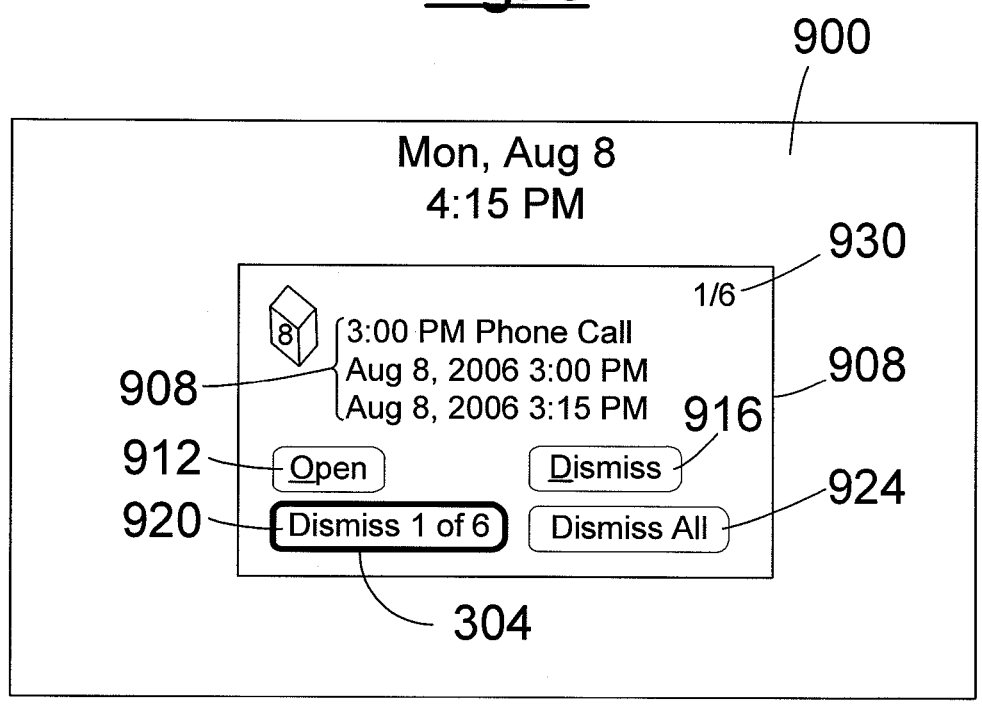
FIG. 9 shows, in diagrammatic form, yet another alternative reminder window.

Still with reference to the dialog window 908 in the foreground of user interface screen 900, this dialog window not only presents the device user with "Open" option 912, "Dismiss" option 916 and "Dismiss All" option 924, but also present the device user with a fourth selectable option 920, namely "Dismiss 1 of 6". The selectable options 912, 916 and 924 have been described previously in this disclosure. If the device user chooses the option 920 he has the option of choosing to set the status attribute of any one of the six pending event reminders to dismissed. Although the option 920 as shown in FIG. 9 reads "Dismiss 1 of 6", the option can be modified by changing the "1 of 6" to "$x_1$ of 6", where $x_1$ is any whole number between 1 and 6. In some examples, the device user does this by pressing a special meaning key(s) or a special meaning key and scroll combination until $x_1$ becomes the desired number. For instance, modification of the "Dismiss X of Y" option 920 might be carried out by holding out the Alt key while rotating the scrollwheel 32b while the selection symbol 304 is positioned at the "Dismiss X of Y" option 920. While this is occurring, the displayed value of $x_1$ might become highlighted or a cursor might appear beneath the displayed value of $x_1$ to indicate that the value of $x_1$ is being changed. In at least one alternative example, modification of the option 920 is carried out by pressing the number key on the keyboard 32a corresponding to the value of $x_1$ that the device user desires. Once the user selects the desired number of event reminders to dismiss, depressing the scrollwheel 32b (or pressing another predetermined key) results in the dismissal of the selected number of pending event reminders. In some embodiments, the "Dismiss All" option may be absent from window 908, and the same functionality obtained by just having the "Dismiss X of Y" option 920 where by default X is set to Y until changed by the user of the device.

As suggested above, in at least some embodiments, when there is a backlog of reminders to be presented, the pending reminders are presented on the display in reverse chronological order such that the first reminder presented on display 22 will be the reminder that is the most recent, and so on, and the last reminder presented is the one that is the oldest. In such a configuration, by selecting a specified number of reminders to dismiss, a device user can skip to the oldest reminder (or reminders) that may be more urgent relevant than recent reminders. In some embodiments, the user can pre-configure the order that they want pending reminders displayed in (reverse chronological or chronilogical).

It will be understood that while the event reminders thread 406 and the event reminders queue that it manages have herein been described as being generic, in some examples, the event reminders thread could be non-generic. For instance, there could be one or more event reminders thread and one or more event reminders queue for each of the calendar application and the tasks scheduling application.

It will also be understood that the calendar application 56 and the tasks scheduling application 58 need not be distinct applications launchable by way of their respective icon 302 within the screen 300 (FIG. 3) of the operating system 50: the calendar application 56 and/or the tasks scheduling application 58 and/or the messaging application 60 could be integrated components of a personal information manager (PIM). In at least one another alternative example, the calendar application 56 is a distinct application launchable from within the screen 300 with a subsidiary component of the calendar application 56 handling tasks scheduling.

Certain adaptations and modifications of the described embodiments can be made. Therefore, the above discussed embodiments are considered to be illustrative and not restrictive.

What is claimed is:

1. A hand-held mobile electronic device comprising:
   a controller including at least one processor, for controlling operation of the mobile device;
   a display coupled to the controller;
   a user input device coupled to the controller;
   a storage coupled to the controller, the storage storing event reminder information identifying a plurality of event reminders and times at which the event reminders are scheduled to be released for display on the display; and
   a rigid case dimensioned to be held in a hand of a user, the case housing the controller, the display, the user input device and the storage;
   the controller being operative to:
   (i) maintain a list of pending event reminders that have been released for display;
   (ii) display on the display an event reminder window corresponding to one of the pending event reminders, the event reminder window including a first user selectable option to dismiss the event reminder corresponding thereto, and a second user selectable option to dismiss a plurality of the pending event reminders;
   (iii) if the first user selectable option is selected through the user input device, remove the displayed event reminder window from the display and display on the display a further event reminder window corresponding to a further one of the pending event reminders; and
   (iv) if the second user selectable option is selected through the user input device, remove the displayed event reminder window from the display and remove the plurality of pending event reminders from the list.

2. The device of claim 1 wherein the user input device includes a combined user depressible and rotatable input mechanism, wherein the controller is operative to cause a selection symbol to move among the user selectable options on the displayed event reminder window upon rotation of the input mechanism, and depression of the input mechanism when the selection symbol is positioned at one of the user selectable options results in selection of the user selectable option at which the selection symbol is positioned.

3. The device of claim 1 wherein the controller is operative to, when displaying the event reminder window, provide on the display a graphical indication of a quantity of the pending event reminders.

4. The device of claim 1 wherein the controller is operative to accept through the user input device a user indication of a number of pending event reminders to be dismissed, and if the second user selectable option is selected through the user input device, remove the indicated number of pending event reminders from the list and display on the display a further event reminder window corresponding to a further one of the pending event reminders still remaining in the list.

5. The device of claim 4 wherein the user input device includes a combined user depressible and rotatable input mechanism operative to move an on-screen selection symbol and a further depressible key, and wherein rotation of the input mechanism while the further depressible key is depressed and the selection symbol is located at a graphical indicator corresponding to the second user selectable option changes the user indication of the number of pending event reminders to be dismissed.

6. The device of claim 1 wherein the controller is configured to sequentially one after the other cause event reminder display windows corresponding to the pending event reminders to be displayed on the display in response to a predetermined input received through the user input device.

7. The device of claim 6 wherein the user input device includes a rotatable input mechanism and a further depressible key, and wherein the predetermined input includes rotation of the input mechanism while the further depressible key is depressed.

8. The device of claim 1 wherein the second user selectable option is a "Dismiss All" option and the controller is operative to remove all of the pending event reminders from the list upon selection of the "Dismiss All" option by a device user.

9. A hand-held mobile electronic device comprising:
processor means for controlling operation of the mobile device;
display means responsive to the processor means for displaying information to a device user;
user input interface means coupled to the processor means for receiving physical inputs from the device user;
storage means coupled to the processor means for storing event reminder information identifying a plurality of event reminders and times at which the event reminders are scheduled to be released for display on the display; and
a rigid case dimensioned to be held in a hand of the device user, the case housing the processor means, the display means, the user input interface means and the storage means;
the processor means including means for:

(i) displaying a selection symbol on the display means and moving the selection symbol in response to inputs received through the user input interface means;
(ii) releasing event reminders upon or after the times at which the event reminders are to be released;
(iii) maintaining a queue of released event reminders;
(iv) displaying on the display means a reminder event window corresponding to one of the event reminders, the reminder event window including a first visual indicator associated with a first user selectable option to dismiss the event reminder corresponding to the reminder event window, and a second visual indicator associated with a user selectable option to dismiss a plurality of the released event reminders;
(v) upon selection by the device user of the first user selectable option, removing the displayed reminder event window from the display means and displaying on the display means a further reminder event window corresponding to a further one of the released event reminders; and
(vi) upon selection by the device user of the second user selectable option, removing the displayed reminder event window from the display means and removing the plurality of released event reminders from the queue.

10. The device of claim 9 wherein user input interface means includes a combined user depressible and rotatable input mechanism, wherein the processor means causes the selection symbol to move on the display means upon rotation of the input mechanism, and depression of the input mechanism when the selection symbol is positioned at one of the visual indicators associated with a user selectable option results in selection of the associated user selectable option.

11. The device of claim 9 wherein the processor means, when displaying the reminder event window, provides on the display means a graphical indication of a quantity of the released event reminders.

12. The device of claim 9 wherein the processor means controller is operative to accept through the user input interface means a user indication of a number of released event reminders to be dismissed, and if the second user selectable option is selected through the user input interface means, remove the indicated number of released event reminders from the list and display on the display means a further reminder event window corresponding to a further one of the released event reminders still remaining in the queue.

13. The device of claim 12 wherein the user input interface means includes a combined user depressible and rotatable input mechanism operative to move the selection symbol and a further depressible key, and wherein rotation of the input mechanism while the further depressible key is depressed and the selection symbol is located at the second visual indicator changes the user indication of the number of released event reminders to be dismissed.

14. The device of claim 9 wherein the processor means is configured for sequentially one after the other causing event reminder display windows corresponding to the released event reminders to be displayed on the display means in response to a predetermined input received through the user input interface means.

15. The device of claim 14 wherein the user input interface means includes a rotatable input mechanism and a further depressible key, and wherein the predetermined input includes rotation of the input mechanism while the further depressible key is depressed.

16. The device of claim 9 wherein the second user selectable option is a "Dismiss All" option and the processor means is configured for removing all of the released event reminders from the queue upon selection of the "Dismiss All" option by a device user.

17. A method for managing event reminders comprising:
providing a hand-held mobile electronic device that includes: (a) a controller including at least one processor, for controlling operation of the mobile device; (b) a display coupled to the controller; (c) a user input device coupled to the controller; (d) a storage coupled to the controller, the storage storing event reminder information identifying a plurality of event reminders and times at which the event reminders are scheduled to be released for display on the display; and (e) a rigid case dimensioned to be held in a hand of a user, the case housing the controller, the display, the user input device and the storage maintaining at the device a list of pending event reminders that have been released for display;

displaying on the display an event reminder window corresponding to one of the pending event reminders, the event reminder window including a first user selectable option to dismiss the event reminder corresponding thereto, and a second user selectable option to dismiss a plurality of the pending event reminders;

if the first user selectable option is selected through the user input device, removing the displayed event reminder window from the display and displaying on the display a further event reminder window corresponding to a further one of the pending event reminders; and if the second user selectable option is selected through the user input device, removing the displayed event reminder window from the display and removing the plurality of pending event reminders from the list.

18. The method of claim 17 wherein the user input device includes a combined user depressible and rotatable input mechanism, the method including causing a selection symbol to move among the user selectable options on the displayed event reminder window upon rotation of the input mechanism, and wherein depression of the input mechanism when the selection symbol is positioned at one of the user selectable options results in selection of the user selectable option at which the selection symbol is positioned.

19. The method of claim 17 including, when displaying the event reminder window, providing on the display a graphical indication of a quantity of the pending event reminders.

20. The method of claim 19 including accepting a user input indicating a number of the pending event reminders to be dismissed and removing the indicated number of pending event reminders form the list.

* * * * *